United States Patent
Eberle

(10) Patent No.: US 8,613,853 B2
(45) Date of Patent: Dec. 24, 2013

(54) FUEL FILTER SYSTEM, ESPECIALLY FOR DIESEL ENGINES

(75) Inventor: Richard Eberle, Saarbrücken (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 554 days.

(21) Appl. No.: 12/736,117

(22) PCT Filed: Apr. 15, 2009

(86) PCT No.: PCT/EP2009/002747
§ 371 (c)(1),
(2), (4) Date: Sep. 10, 2010

(87) PCT Pub. No.: WO2009/129956
PCT Pub. Date: Oct. 29, 2009

(65) Prior Publication Data
US 2011/0000833 A1    Jan. 6, 2011

(30) Foreign Application Priority Data
Apr. 22, 2008  (DE) .......................... 10 2008 020 233

(51) Int. Cl.
*F02M 37/22*  (2006.01)
*B01D 36/04*  (2006.01)
*B01D 35/18*  (2006.01)

(52) U.S. Cl.
CPC .................................. *B01D 35/185* (2013.01)
USPC ........... 210/104; 210/114; 210/120; 210/180; 210/313

(58) Field of Classification Search
CPC ..................................................... B01D 35/185
USPC .................. 210/86, 104, 109, 114, 115, 120, 210/167.32, 180, 184, 185, 186, 187, 313, 210/416.4, 533, 539, DIG. 6
See application file for complete search history.

(56) References Cited

U.S. PATENT DOCUMENTS 4,334,989 A * 6/1982 Hall .............................. 210/114
7,850,846 B2 * 12/2010 De La Azuela et al. ...... 210/295

FOREIGN PATENT DOCUMENTS

| DE | 101 60 497 A1 | 6/2003 |
|---|---|---|
| DE | 10 2006 046 752 A1 | 4/2007 |
| EP | 1 435 452 A2 | 7/2004 |
| EP | 1 581 736 B1 | 10/2005 |
| EP | 1 726 818 A2 | 11/2006 |
| WO | WO 2004/061289 A1 | 7/2004 |

* cited by examiner

*Primary Examiner* — Terry Cecil
(74) *Attorney, Agent, or Firm* — Roylance, Abrams, Berdo & Goodman LLP

(57) ABSTRACT

A fuel filter system, especially for Diesel engines includes filter housing (1) having a fuel inlet (27) and a fuel outlet (29) and a dehydrating filter medium (23) between the inlet and the outlet for the fuel to pass through. The filter housing (1) has a collection chamber (35) for the water trapped by the filter medium from which collection chamber the water can be supplied to a water absorbing and evaporating device (49) via a controlled dispenser (45). The components of the evaporating steam are releasable into the environment through the evaporating steam outlet (51). The water absorbing and evaporating device (49) has a valve arrangement (59, 61) by which the evaporating water outlet (51) can be closed depending on an inadmissible amount of non-evaporated water (55) collected in the evaporating device (49).

11 Claims, 2 Drawing Sheets

FUEL FILTER SYSTEM, ESPECIALLY FOR DIESEL ENGINES

FIELD OF THE INVENTION

The invention relates to a fuel filter system, especially for diesel engines, with a filter housing having a fuel inlet, a fuel outlet and a water separating filter medium through which fuel can flow and which is located between the inlet and outlet. The filter housing has a collection chamber for water separated by the filter medium. From the collection chamber, water can be fed via a controllable release device to a water absorbing and evaporating device. From the evaporating outlet of the water absorbing and evaporating device, the components of the exhaust vapor can be released into the environment.

BACKGROUND OF THE INVENTION

To protect the engine injection system, fuel filter systems are usually designed in such that not just impurities such as floating particulates, dust, etc., are separated, but also that water is separated and removed. Since the separated water may still be contaminated with diesel oil, it cannot be released directly into the environment. Specifically, the water may contain dissolved diesel components or micro-droplets that have not been separated by the pressure differential between the water and the diesel oil in the sump collected in the collection chamber. Consequently, prior art includes providing measures for purifying the separated water before it is released into the environment.

In this context, a fuel filter system of the type mentioned above is known from EP 1 581 736 B1. This known solution specifies that separated water that is still loaded with substances that are harmful to the environment are not to be released into the environment directly in the fluid phase. Rather, those substances are to be fed to an evaporation device from which the exhaust vapor is released into the environment downstream from the release device.

A generically different solution, cf. EP 1 726 818 A2, the separated water, without an evaporation or vaporization process taking place, is released into the environment in the fluid phase. Before release, a membrane permeable to water molecules, in the form of, for example, a ceramic membrane, retains the substances that are harmful to the environment. Aside from the fact that such membranes have to be replaced after a limited service life, they require that pressure be built up for flow pass-through to take place.

SUMMARY OF THE INVENTION

An object of the invention is to provide an improved fuel filter system having greater operating reliability and particularly efficient purification.

According to the invention, this object is basically achieved by a fuel filter system having a water absorbing and evaporating device with a valve arrangement by which the exhaust vapor outlet of the evaporator device can be closed if an excess amount of unevaporated water collects in the evaporator device. The risk of a malfunction of the system posing a hazard to the environment can then be reliably avoided. Even in the event of a failure of the control function of the release device, for example, in the case where a release valve remains permanently open or a release pump connected to the collection chamber remains continuously in operation, meaning that from the sump connected to the collection chamber an excessive amount of separated water still carrying pollutants and, potentially, diesel oil located even above the separation layer in the sump might reach the evaporator device, closing the exhaust vapor outlet prevents the environment from being polluted.

In advantageous embodiments, the water absorbing and evaporating device has an evaporator housing that can be connected to the collection chamber via the controllable release device. The valve arrangement has a float valve that will close the exhaust vapor outlet if there is an excessive fill level of water accumulated in the evaporator housing. Such embodiments are distinguished by an especially simple and reliable construction. For example, the float valve can be designed as a ball valve in which a closing ball can be designed as a float which, when it floats upward, rests directly against a valve seat surface provided on the exhaust vapor outlet, closing it.

Advantageously, the filter housing can define a central vertical axis, with the evaporator housing is formed by a tube-shaped, central inner body of the filter housing. The inner body is coaxial with the axis. In the case of such a coaxial construction, the entire system of the fuel filter, water separator, collection chamber, and water absorbing and evaporating device forms a single construction unit, for example, with an overall circular-cylindrical shape of a complete housing.

Advantageously, the outside of the inner body is contiguous with the inner clean side of the concentrically arranged filter medium.

In an especially advantageous embodiment, the exhaust vapor outlet is placed upstream from the release device on the upper end of the inner body that forms the evaporator housing. Exhaust vapor rising in the evaporator housing can then exit from the overall housing directly from its upper end.

Since the boiling point of diesel oil far exceeds that of water, the exhaust vapor is virtually free of diesel oil if the boiling point is properly selected, for example, if it remains below the boiling point of water so that the exhaust vapor is essentially a rising water vapor or mist. The possibility cannot be ruled out, however, that even if the evaporation process is carried out properly, some residual pollutants may remain in the exhaust vapor, for example, microparticles that are entrained by the vapor that is formed. With this in mind, in especially preferred embodiments, an exhaust vapor filter device is provided upstream from the exhaust vapor outlet of the evaporator housing.

Since the exhaust vapor is pre-purified to be virtually free of diesel-oil components as much as possible because of the boiling process, an activated carbon filter device can be provided as an exhaust-vapor filter device. Since in the invention no separated water that still contains oil components is sent directly through the activated carbon filter because the filter is located downstream from the evaporator device, in which to a certain extent an aggregate change of state into the gaseous state takes place, the risk of saturation of the activated carbon and the associated loss of purification action is avoided.

In especially advantageous embodiments, the release of water from the release device can be controlled by a water sensor device that detects the water fill level in the collection chamber. In this way, the release processes can be structured in automatic operation such that from the sump collected in the collection chamber in which gravitational separation (layering) between the diesel oil and water already takes place, the lower, heavier water portion is intermittently released in each case.

If the fuel pump of the correspondingly assigned internal combustion engine is arranged upstream from the fuel inlet of the filter housing, the release device can have a release valve that is controlled by the water sensor device. Conversely, if the fuel pump is connected to the fuel outlet of the filter housing, instead of the release valve a pump can be controlled by the water sensor device. The pump feeds the water to be released to the water absorbing and evaporating device against the underpressure generated by the fuel pump in the filter housing.

To allow the evaporation process to proceed in the desired way, so that a vaporization process occurs at a temperature that is preferably slightly below the boiling point of water, in advantageous embodiments in the evaporator housing, a preferably controllable device for supplying heat, for example, in the form of a heating device or a heat exchanger transfers heat from the cooling system, the lubricating system, or the exhaust gas system of an associated internal combustion engine.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

The invention is explained below using embodiments in which the fuel filter system is part of the system for supplying a diesel engine (not shown) with diesel oil. The invention can also be used in connection with other hydrocarbon compounds that serve as fuels in which it is desirable or necessary to separate water before combustion in the engine.

Figure 1:
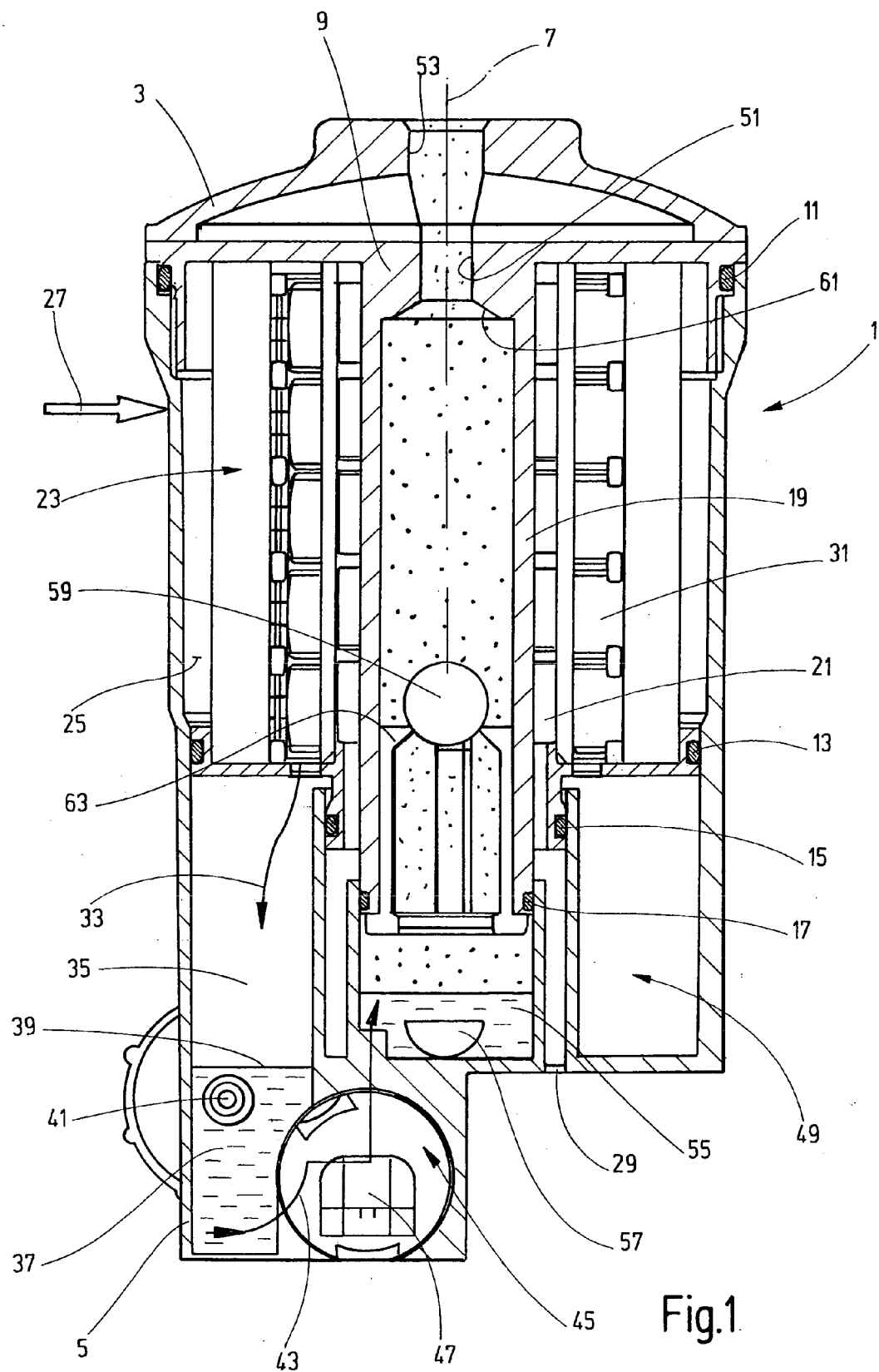
FIG. 1 is a highly schematic, side elevational view in section of a fuel filter system according to a first exemplary embodiment of the invention, where during the operation of the system fluid media located therein are identified.

FIG. 1 shows a first embodiment with a filter housing 1 tightly sealed at the top by a removable cover 3. Aside from a bottom part 5, the housing 1 has an essentially circular-cylindrical shape with a central vertical axis 7. From the top of the housing 1, which is open when the cover 3 is removed, a coaxial inner body 9 is inserted into the housing 1. The inner body is sealed against the housing walls by sealing arrangements 11, 13, 15, and 17. With its coaxial inner pipe 19, the inner body 9 forms an evaporator housing.

The outer side of the inner pipe 19 abuts the clean side 21 of a concentric fuel filter device 23 mounted on the inner body 9. The filter device dirty side 25 feed is directed via a fuel inlet (not shown) as indicated only by a flow arrow 27. After flowing through the filter device 23 from the outside inward, the diesel oil passes from the clean side 21 to a bottom-side fuel outlet 29.

The filter device 23 is built conventionally such that water separation takes place in a separation zone 31. As indicated by arrow 33, separated water together with diesel oil passes into a collection chamber 35 formed by a lower housing section that abuts the bottom part 5. Owing to the higher specific weight of water relative to diesel oil, during operation a bottom-side sump 37 of the separated water forms in the collection chamber 35. The upper separation line 39 relative to the lighter diesel oil lies above the water. The height of the separation line 39 of the sump 37 of separated water relative to the diesel oil located above it is detected by a water level sensor 41.

As indicated by flow arrow 43, on the floor of the sump 37 a release device 45 is connected whose operation can be controlled based on the signals from the water level sensor 41. In the case of the embodiment, in which the fuel pump is arranged downstream from the fuel outlet 29 and where during operation an underpressure therefore prevails in the filter housing 1, the release device 45 has a pump 47. The operation of this pump is controlled by the water level sensor 41 such that during operation enough water of the sump 23 is drained from the collection chamber 35 so that the separation line 39 does not drop to the connection point with the release device 45. The pump 47 then delivers separated water to a water absorbing and evaporating device 49.

As part of the water absorbing and evaporating device 49, the inner pipe 19 of the inner body 9 forms an evaporator housing. Upstream from the release device 45 the evaporator housing extends coaxially upward to an exhaust vapor outlet 51 to which an exhaust vapor outlet 53 in the cover part 3 connects.

To ensure controlled evaporation of the water 55 that is delivered by the pump 47 into the evaporator housing 19, at the bottom of the evaporator housing there is an element 57 for the controlled delivery of heat. This element can be a separate heating system or a heat exchanger for the delivery of engine heat, exhaust-gas heat, or coolant heat. It is particularly advantageous to use a PTC element, that is, a resistive element with a positive plot of the temperature coefficient. With the PTC element regulating and control devices or overtemperature protection can be eliminated.

From the water 55 that is fed by the pump 47 and is pre-purified by gravity layer separation in the collection chamber 35, evaporation ensures the formation of a water mist or vapor which, as indicated in FIG. 1, rises in the inner pipe 19 and passes to the outside via the exhaust vapor outlet 51 of the inner pipe 19 and the vapor outlet 53 in the cover part 3.

As already mentioned, the water absorbing and evaporating device 49 contains a safety device in the form of a valve arrangement which closes based on the presence of an excessive quantity of collected unevaporated water 55 collected. In the case of the present embodiment, a float valve is provided for this purpose. For a closing body, the float valve has a float ball 49 that works with a valve seat surface 61 on the exhaust vapor outlet 51 and which closes said outlet when it rises by making contact with the valve seat surface 61. When there is a normal quantity of fluid in the evaporator housing as controlled by the operation of the pump 47, the float ball 59, as shown in FIG. 1, is at some distance from the valve seat surface 61 with the ball 59 resting on holding ribs 63.

Figure 2:
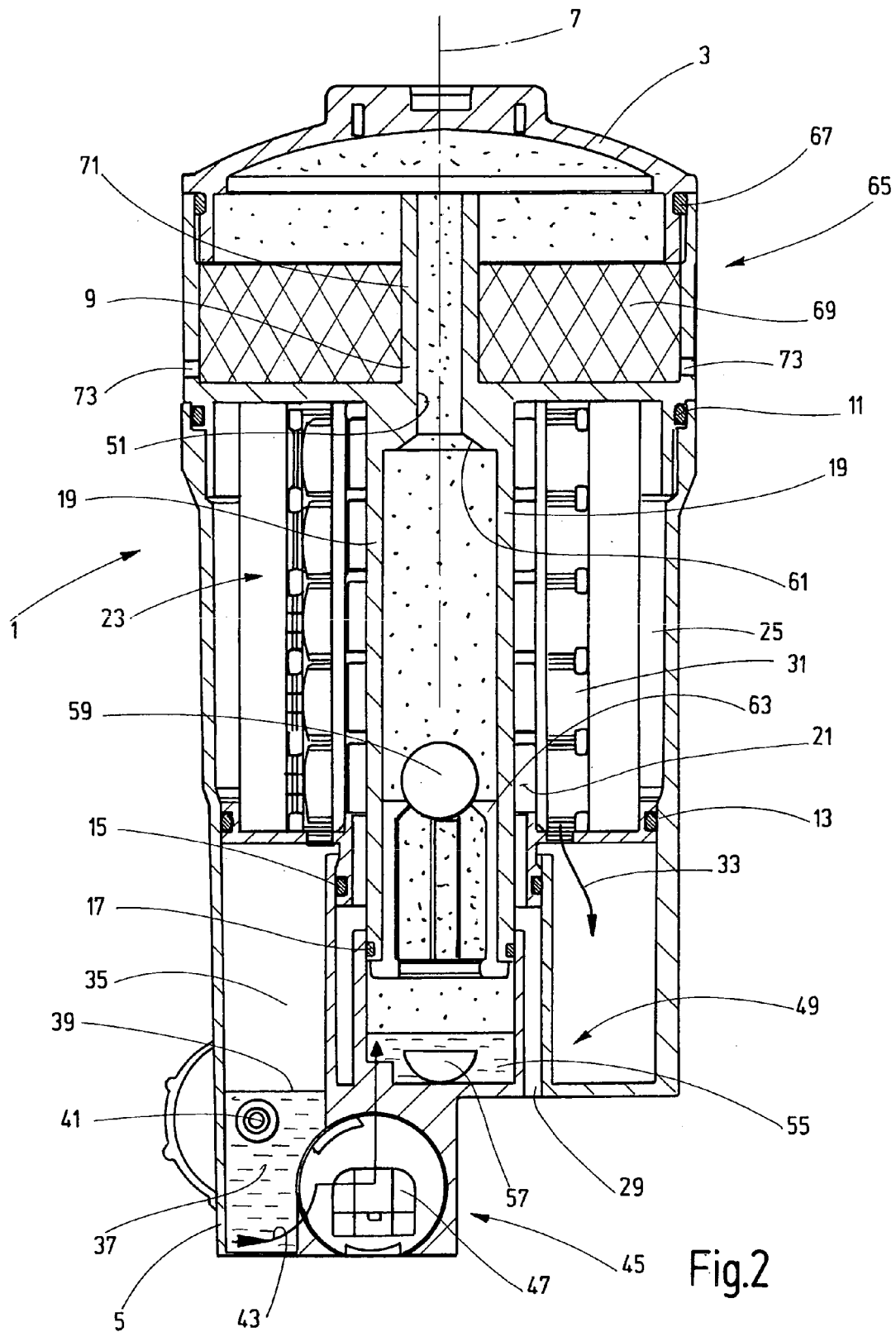
FIG. 2 is a highly schematic, side elevational view in section of a fuel filter system according to a second exemplary embodiment of the invention.

The second embodiment shown in FIG. 2 is distinguished from the first embodiment by, upstream from the evaporator housing 19, an exhaust vapor filter device 65 being connected to its exhaust outlet 51. This exhaust vapor filter device is located in the upper area of the inner body 9 which, with seal 67 inserted in between, is closed with a closed cover part 3 having no exhaust vapor outlet 53. As the filter medium for the exhaust vapor filter device 65, an activated carbon filter 69 is provided which concentrically surrounds the end section 71 of the inner pipe 19. As indicated in FIG. 2, the water vapor or mist emerging from the end section 71 passes as a highly pure vapor or highly pure, condensed fluid from the top into the activated carbon filter 69 and leaves the housing via slit openings 73 that are made in the side wall surrounding the activated carbon 69.

Because of the pretreatment of the separated water 55 that is done by the evaporator device 49, other adsorptive materials besides activated carbon 69 can also be used. With most of the membranes and molecular sieves that can separate dissolved components, a differential pressure is required that can be built up by, for example, an auxiliary pump, such as in EP 1 726 818 A2, or by having the water be superheated in the evaporator device in order to build up pressure.

While various embodiments have been chosen to illustrate the invention, it will be understood by those skilled in the art that various changes and modifications can be made therein without departing from the scope of the invention as defined in the appended claims.

What is claimed is:

1. A fuel filter system, comprising:
   a filter housing having a fuel inlet and a fuel outlet;
   a water separating filter medium through which fuel can flow in said filter housing between said fuel inlet and said fuel outlet;
   a collection chamber in said filter housing for water separated by said filter medium;
   a water absorbing and evaporating device in fluid communication with said collection chamber via a controllable release device for feeding of water in said collection chamber to said water absorbing and evaporating device, said water absorbing and evaporating device having an exhaust vapor outlet for releasing exhaust vapor components formed in said water absorbing and evaporating device into an environment; and
   a valve arrangement of said water absorbing and evaporating device closing said exhaust vapor outlet when an excessive amount of unevaporated water is collected in said water absorbing and operating device.

2. A fuel filter system according to claim 1 wherein
   said water absorbing and evaporating device comprises an evaporator housing connectable to said collection chamber via said controllable release device; and
   said valve arrangement comprises a float valve closing said exhaust vapor outlet when an excessive fill level of water is collected in said evaporator housing.

3. A fuel filter system according to claim 2 wherein
   said filter housing defines a central vertical axis; and
   said evaporator housing comprises a tube-shaped central inner body in said filter housing, said inner body being coaxial with said axis.

4. A fuel filter system according to claim 3 wherein
   an outer side of said inner body abuts a clean side of said filter medium, said filter medium being concentrically arranged relative to said inner body.

5. A fuel filter system according to claim 3 wherein
   said evaporator housing comprises a controllable heat supplier.

6. A fuel filter system according to claim 1 wherein
   said water absorbing and evaporating device comprises an evaporator housing of an inner body; and
   said exhaust vapor outlet is located upstream from said controllable release device on an upper end of said inner body.

7. A fuel filter system according to claim 6 wherein
   an exhaust vapor filter is upstream from said exhaust vapor outlet.

8. A fuel filter system according to claim 7 wherein
   said exhaust vapor filter is an activated carbon filter.

9. A fuel filter system according to claim 1 wherein
   said controllable release device is connected to and controlled by a water sensor that detects a water fill level in said collection chamber.

10. A fuel filter system according to claim 9 wherein
    said controllable release device comprises a release valve controlled by said water sensor.

11. A fuel filter system according to claim 9 wherein
    said controllable release device comprises a pump controlled by said water sensor.

* * * * *